United States Patent [19]

Hall

[11] 4,031,878

[45] June 28, 1977

[54] CROWN CUTTING WIRE

[76] Inventor: George H. Hall, P.O. Box 244, Westford, Mass. 01886

[22] Filed: Nov. 12, 1975

[21] Appl. No.: 631,083

[52] U.S. Cl. .................................................. 125/21
[51] Int. Cl.² .......................................... B28D 1/08
[58] Field of Search ........................ 125/12, 18, 21; 51/206 R

[56] References Cited

UNITED STATES PATENTS

| 125,804 | 4/1872 | Gear | 125/12 |
|---|---|---|---|
| 2,003,994 | 6/1935 | D'Avocourt | 125/12 |
| 2,473,104 | 6/1949 | Lefeure | 125/21 |
| 3,221,728 | 12/1965 | Lindblad | 51/206 X |
| 3,343,308 | 9/1967 | Fessel | 125/21 X |
| 3,383,807 | 5/1968 | Miller | 51/206 R |
| 3,847,569 | 11/1974 | Snow | 125/21 |
| 3,886,926 | 6/1975 | Hall | 125/21 |

*Primary Examiner*—Harold D. Whitehead
*Attorney, Agent, or Firm*—Schiller & Pandiscio

[57] ABSTRACT

A wire saw having improved stress-fatigue characteristics is disclosed. The saw comprises an elongated flexible metallic body having a substantially circular cross section, and a plurality of cutting segments or blocks of comminuted abrasive in a bonding matrix resiliently mounted on said body in spaced-apart relation to one another in a helical pattern along the length of the body. In a preferred embodiment of the invention, the body has at least one helical ridge along its length. The cutting block bottom surfaces are slotted or grooved to mate with the ridge, and the blocks are mounted on the ridge.

9 Claims, 4 Drawing Figures

CROWN CUTTING WIRE

This invention relates to cutting tools and more particularly to cutting tools of the type which employ abrasive composites as cutting elements.

Composites formed of finely comminuted abrasive particles, such as diamond dust or grit, or silicon carbide or the like disposed in a matrix such as metal or ceramic as is well known in the art are used extensively as the cutting elements in tools for slicing large blocks of minerals such as marble, granite and the like. For cutting large blocks of such minerals, particularly to make architectural facings, the prior art has developed a number of types of very large cutting tools, but which generally have a number of problems. For example, one prior art system employs a solid rotary blade with a number of diamond-metal matrix composite blocks bonded to the periphery of the blade as the abrasive cutting elements. Making wide cuts requires a large blade (e.g. with a radius of six feet or more). Such a rotary blade tends to flex laterally with respect to its plane of rotation. Hence, such a blade has to be very thick to impart the structural rigidity necessary to provide clean cuts. However a thick blade cuts an equally thick swath and is therefore slow, produces an excessive amount of swarf while destroying valuable mineral, is wasteful of abrasive material and is obviously quite expensive to operate.

Oscillating blades in which the diamond composite blocks are fixed to the cutting surface of the saw have also been used for cutting large blocks of minerals. However, the operation of an oscillating blade is considerably slower than that of a rotary blade and fairly complex equipment is required to oscillate the saw-blade to achieve a cut of any substantial architectural size. Furthermore, such a blade is also subject to a lateral flexing problem; thus such blades must also be reinforced, and thus tend to be thick and hence wasteful of both abrasive and mineral in operation. Also, sawing rates with this type of equipment typically is relatively slow due to limitations in the surface speed at which the cutting elements can be moved.

In either case, with a substantially rigid blade the abrasive composite blocks providing the cutting elements for the system are primarily subjected to shear forces due to the cutting motion of the saw. On the other hand, in the case of a rigid blade, the blade periphery or edge upon which the abrasive blocks are mounted generally undergoes little deformation by virtue of the supporting structure of the blade. Hence, the means which are used to fix the abrasive composite blocks to the blade need only to be designed to withstand shear forces acting substantially parallel to the direction of the cutting motion of the blade, but little or no flexure.

Another system which has heretofore been used, particularly for cutting large blocks of minerals to large dimensions employs a twisted wire and a slurry of silicon carbide grit as the abrasive cutting elements. However, this system also is relatively slow, consumes a large quantity of silicon carbide which is somewhat expensive and also requires a large quantity of fresh water for washing and cooling. This latter requirement has become a particular problem in recent times due to recently enacted pollution control laws which have forced closings of some quarries employing this type of cutting system.

Still another type of cutting tool especially useful for cutting large blocks of minerals to large dimensions has been disclosed in my earlier U.S. Pat. No. 3,886,926. In this patent a wire saw is described which comprises an elongated, flexible substantially cylindrical, metallic substrate body in a loop, held under tension around a pair of sheaves. The body has at last one helical slot along its length, and a plurality of abrasive composite blocks mounted in the slot in spaced relation along the body by a metallic braze comprising a layer of an elastically pliant metal sandwiched between a pair of bonding layers of metal. An advantage of my patented wire saw is that the layer of elastically pliant metal forms a cushion or barrier which thus allows the wire to flex or bend, e.g. around the sheaves, without adversely effecting the integrity of the bond between the abrasive blocks and the substrate body. A modification of my patented wire saw is disclosed in my co-pending application Ser. No. 513,716 filed Oct. 10, 1974, and now abandoned, according to which the braze is replaced by an elastically pliant epoxy based adhesive. On the other hand, wire saws made in accordance with my aforesaid U.S. pat. No. 3,886,926 and application Ser. No. 513,716 are not ideal from a standpoint of stress-fatigue characteristics. This latter characteristic is due to a requirement of my earlier wire saws that the substrate wire have on or more slots for mounting the cutting blocks onto the substrate wire. As a result, the stress strain capability of the substrate wire is reduced somewhat but without any comparable reduction in bending stress. Thusm for a given substrate material, the wire saws as taught in my aforesaid U.S. Pat. No. 3,886,926 and application Ser. No. 513,716 are not ideal in terms of tensile strength and/or flexibility. Furthermore, since the abrasive blocks are mounted in slots below the surface of the wire substrate, the blocks occasionally may not be substantially entirely consumed before the wire substrate fails as a result of itself being worn down by cutting. As a result, an undersirably large and expensive amount of abrasive material may occasionally be left on a wire saw at retirement of the saw.

It is thus a primary object of the present invention to provide a novel wire saw which provides an improvement over the prior art. Yet other important objects of the present invention are to provide a novel wire saw structure of high tensile strength which permits rapid and economical cutting of large blocks or architectural mineral material at high speeds with a narrow cut and which saw structure substantially maximizes thetensile strength while minimizing the bending stress.

Other objects of the invention will in part be obvious and will in part appear hereinafter. The invention accordingly comprises the products possessing the features, properties and relation of elements which are all exemplified in the following detailed disclosure and the scope of the application of which will be indicated in the claims.

Generally, to effect the foregoing and other objects the present invention contemplates an abrasive tool which comprises an elongated, flexible metallic body having at a substantially circular cross sectional area, and a plurality of cutting segments or blocks of comminuted abrasive in a bonding matrix, mounted on said body in spaced-apart relation to one another in a helical pattern, i.e. along at least one helical line along the body length. The cutting block bottom surfaces are shaped to substantially mate the curved surface upon which they are mounted, and the blocks are mounted to the body by means of a resilient mounting which may comprise a metallic braze having a layer of an elastically pliant metal as described in my aforesaid U.S. pat. No. 3,886,926 or the resilient mounting may comprise an elastically pliant epoxy material such as an epoxy resin as described in my aforesaid co-pending application Ser. No. 513,716. In a preferred embodiment of the invention, the body has at least one helical surface ridge along its length. The cutting block bottom surfaces are slotted or grooved to mate the ridge; and the blocks are mounted in spaced-apart relation along the ridge.

The metallic substrate is preferably a steel wire exhibiting negligible elongation under extreme tension short of its elastic limit, the wire preferably having two spiral lines of cutting blocks opposite one another. The cutting elements are bonded in place on the wire surface as a series of spaced teeth, using a resilient mounting as above mentioned. The wire is arranged in an endless belt and held in tension between at least two sheaves having grooves lined with a comparatively soft, elastic material which the abrasive elements can engage without substantially tearing, cutting, or gouging. Further details of the arrangement of the wire are described in my aforesaid U.S. Pat No. 3,886,926.

For a fuller understanding of the nature and objects of the present invention, reference should be made to the following detailed description taken in connection with the accompanying drawings wherein.

Figure 1:
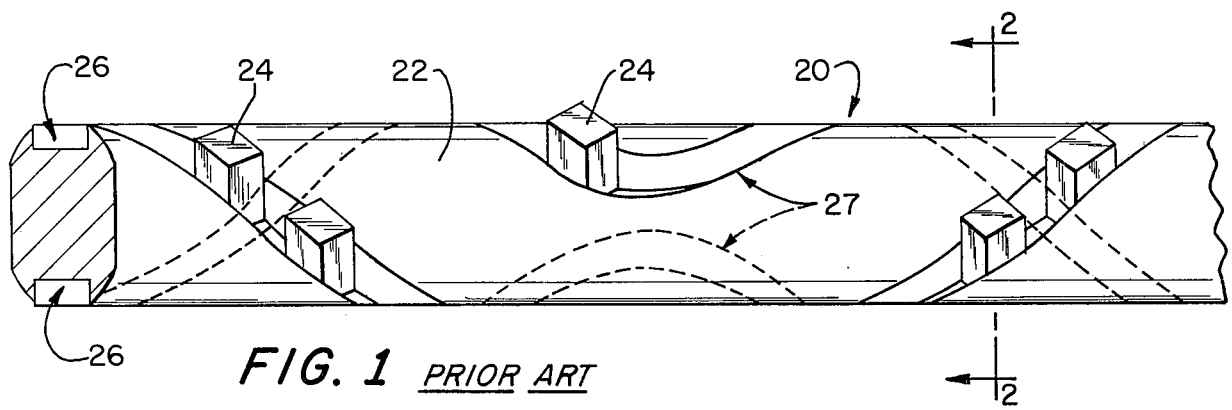
FIG. 1 is a fragmentary perspective view of a portion of a wire saw in accordance with the prior art.
Figure 2:
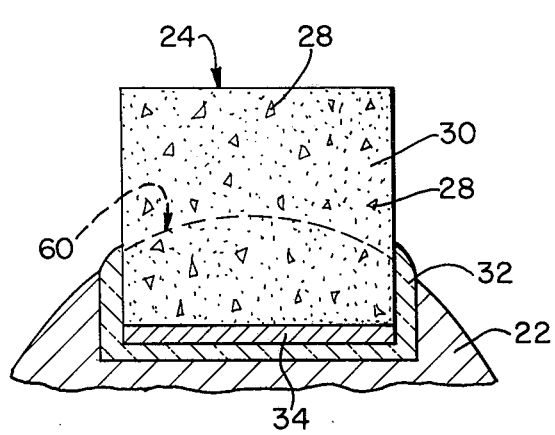
FIG. 2 is an enlarged cross-sectional view of a portion of the saw of FIG. 1 taken along line 2—2.

Referring now to the drawings there is shown in FIGS. 1 and 2 one embodiment of a prior art wire saw, generally referred to at 20, and made in accordance with the teachings of my aforesaid U.S. application Ser. No. 513,761. The saw comprises an elongated body or substrate member 22 made of a metal such as steel wire or the like. Body 22 may have a generally elliptical cross-section as shown or other shapes, as for example, circular, triangular or square. Body 22 supports a plurality of abrasive segments or blocks 24 as will be described in detail hereinafter.

Body 22 has one or more relatively thin, narrow notches or slots 26 as formed on its surface, diagonal to its length. As shown in FIG. 1 slots 26 are in the form of elongated grooves, forming a helix around the long axis of body 22. Alternatively, slots 26 may also comprise a plurality of short notches (not shown) which are preferably arranged substantially on a helical line along body 22. The twist direction of the helix or helical line is reversed along the wire, (e.g. every 15–feet) as at 27.

A plurality of relatively short abrasive segments or blocks 24 are mounted in spaced-apart relation in slots 26. Blocks 24 comprise a mixture of diamond particles, e.g. diamond bits and grit 28 in a bonding matrix 30, all as well known in the art. The abrasive element blocks 24 are held in slots 26 by a flexible mounting which comprises a layer of film 32 of an elastically pliant epoxy based adhesive. Preferably also a thin layer or film 34 of a flexible metal such as copper is metallurgically bonded to the blocks as an interface between blocks 24 and the adhesive 32, all as in accordance with the teachings in my aforesaid U.S. application Ser. No. 513,716. Alternatively, the flexible mounting may comprise a braze which includes a layer of an elastically pliant metal in accordance with the teachings of my aforesaid U.S. Pat. No. 3,886,926.

As thus described, such a wire saw has the ability to flex (to a limited extent) due to the provision of the flexible mounting and as a characteristic of the steel substrate body 22. Accordingly, the wire saw may be formed into an endless loop for mounting around sheaves, thus permitting rapid cutting of large blocks of architectural mineral material as in accordance with the teachings of my aforesaid U.S. Pat. No. 3,886,926. However, as the diameter of the wire is reduced (i.e. to reduce bending stresses in the wire and thus permit continued flexure) the tensile strength, which is proportional to the cross sectional area of the wire is also reduced. Thus, the reduction in the substrate cross sectional area due to the presence of slots has the effect of reducing the tensile strength of the wire saw while the bending stresses in the wire are not reduced. These problems are minimized by the wire saw of the present invention as will become clear from the description of the instant invention which follows.

Figure 3:
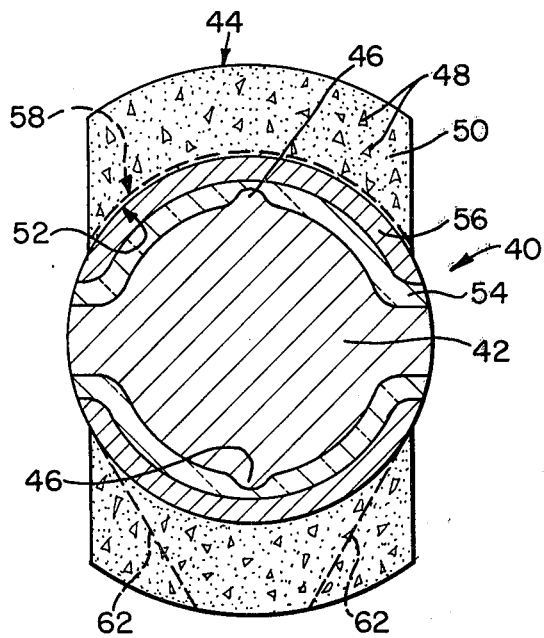
FIG. 3 is a fragmentary perspective view of a portion of a wire saw in accordance with the instant invention.
Figure 4:
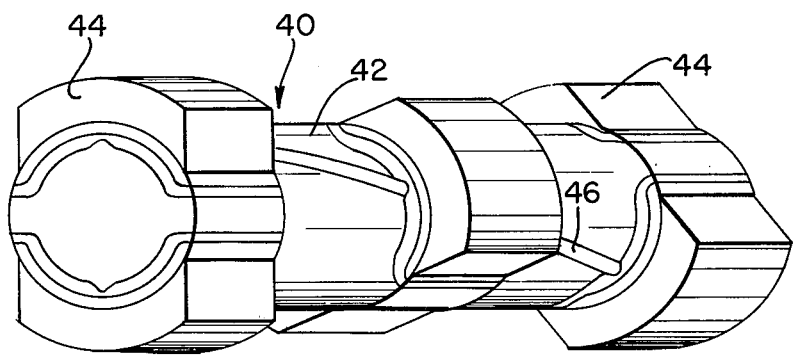
FIG. 4 is an enlarged cross-sectional view of a portion of the saw of FIG. 3 taken along line 4—4.

Referring now to FIGS. 3 and 4 there is shown a preferred embodiment of a wire saw made in accordance with the present invention. The saw referred to generally at 40 is somewhat similar to the wire saws formed in accordance with my aforesaid U.S. Pat. No. 3,886,926 and my application Ser. No. 513,716 in that the saw comprises an elongated body or substrate member 42 made of a metal such as steel wire or the like. Body 42 preferably has a generally circular cross-section as shown so as to maximize cross-sectional area and thus tensile strength for a given cross sectional dimension. However, body 42 may have a somewhat elliptical cross-section without significant loss of tensile strength for a given cross sectional dimension.

Body 42 has one or more ridges 46 formed on its surface, running substantially diagonal to its length. As shown in FIG. 3 slots 46 are in the form of elongated ridges, forming a helix around the long axis of body 42. Alternatively, ridges 46 may also comprise a plurality of short tabs (not shown) which are preferably arranged substantially on a helical line along body 42. As in the case of wire saws formed in accordance with my aforesaid U.S. Pat. No. 3,886,926 and my application Ser. No. 513,716, it is preferred that the twist direction of the helix or helical line be reversed along the wire, (e.g. every 15–20 feet) (not shown). The substrate just described has improved tensile strength and bending ability as compared with the substrate shown in FIGS. 1 and 2. For example, for a substrate body as shown in FIGS. 3 and 4 and formed of 0.1875 inch diameter maraging steel wire (type 200), has a cross sectional area of about 0.02341 square inches, and a bending stress (around a 7 feet 2 inches diameter) of about 57,775 psi. On the other hand, a slotted wire saw formed of the same wire but in the configuration as shown in FIGS. 1 and 2, will have a cross sectional area of only about 0.0166 square inches, while the bending stress (which is proportional to the maximum wire diameter or cross sectional dimension) will still average about 57,775 psi (around a 7 feet 2 inches diameter). On the other hand, since the wire saw of the present insertion as shown in FIGS. 3 and 4 has a cross-sectional area which is 41% greater than that of the wire saw of the prior art as shown in FIGS. 1 and 2, the wire saw of the present invention has 41% greater tensile capacity.

A plurality of relatively short abrasive segments or blocks 44 are mounted in spaced-apart relation on ridges 46. Blocks 44 comprise a mixture of diamond particles, e.g. diamond bits and grit 48 in a bonding matrix 50, all as well known in the art. The bottom surfaces of abrasive element blocks 44 are slotted or shaped as at 52 to mate with the curved outer surface of the substrate body 42, and onto the top of ridges 46. The blocks are held in place on the ridges by a flexible mounting which may comprise a layer of film 54 of an elastically pliant epoxy based adhesive and, if desired, a thin layer or film 56 of a flexible metal such as copper, metallurgically bonded to the blocks as an interface between blocks 44 and the adhesive 54, for example as in accordance with teachings in my aforesaid U.S. application Ser. No. 513,716. Alternatively, the flexible mounting may comprise a braze which includes a layer of an elastically pliant metal in accordance with the teachings of my aforesaid U.S. Pat. No. 3,886,926.

As thus described, the wire saw of the invention has the ability to flex due to the provision of the flexible mounting. Accordingly, the wire saw may be formed into an endless loop for mounting around sheaves, thus permitting rapid cutting of large blocks of architectural mineral material as in accordance with the teachings of my aforesaid U.S. Pat. No. 3,886,926. However, unlike wire saws made in accordance with the teachings of my aforesaid U.S. Pat. No. 3,886,926 or my application Ser. No. 513,716 since the wire substrate of the present invention has a greater cross-sectional area for a given diameter, the saw has greater tensile strength with no decrease in bending or flexure capability. And, as the block wears during use, it tends to wear down to a shape such as indicated by the broken line at 58 (FIG. 4); cf. the wear line 60 of the wire saw of FIG. 2. As a result, only a small amount of abrasive composite is wasted, the useful life of the wire saw is increased, and saw blade costs and downtime are thus also reduced.

It is to be noted also that forming the bottom surface of the cutting blocks to substantially mate with the outside curved surface of the substrate body, provides relatively large common or facing surfaces for application of the adhesive or mounting which may result in improved adhesion between the blocks and the substrate.

Various changes may be made without departing from the scope of the invention herein. For example, the cutting segments may be tapered as shown in broken line 62 (FIG. 3), from a relatively narrow upper surface to a somewhat wider base, i.e. adjacent the substrate body. Thus, as the saw wears, the cutting segments decrease in height resulting in a narrower cut being made. On the other hand, due to the tapered shape of the segments, the cutting area of the segments increases. As a result a substantially constant cutting rate may be achieved through the life of the wire saw.

I claim:
1. A wire saw comprising in combination:
an elongated flexible metallic body having a substantially circular cross section, a curved outer surface and, at least one helical ridge on said curved outer surface along the length of said body,
a plurality of blocks of composite comminuted abrasive in a bonding matrix resiliently mounted on said body along said at least one ridge in spaced-apart relation to one another;
the bottom surfaces of said blocks being shaped to substantially mate with said body outer surface.
2. A saw as defined in claim 1 wherein said blocks are mounted to said body by an elastically pliant epoxy based adhesive.
3. A saw as defined in claim 2, further including a layer which comprises a flexible metal, sandwiched between said body and said blocks so as to extend completely between each of said blocks and said body, and being metallurgically bonded to said blocks.
4. A saw as defined in claim 3, wherein said flexible metal comprises copper in major proportion.
5. A saw as defined in claim 1 wherein said abrasive is diamond.
6. A saw as defined in claim 1 wherein the twist direction of said line is reversed along the wire.
7. A saw as defined in claim 1 wherein the bottom surfaces of said blocks are shaped to also mate with said ridge.
8. A saw as defined in claim 1, wherein said body is in the form of an endless loop.
9. A saw as defined in claim 1 wherein said blocks are tapered from a relatively narrow cutting surface area to a relatively wider base area.

* * * * *